Nov. 18, 1969
E. P. ARTHUR
3,479,255
ELECTROCHEMICAL TRANSDUCER
Filed Jan. 27, 1964
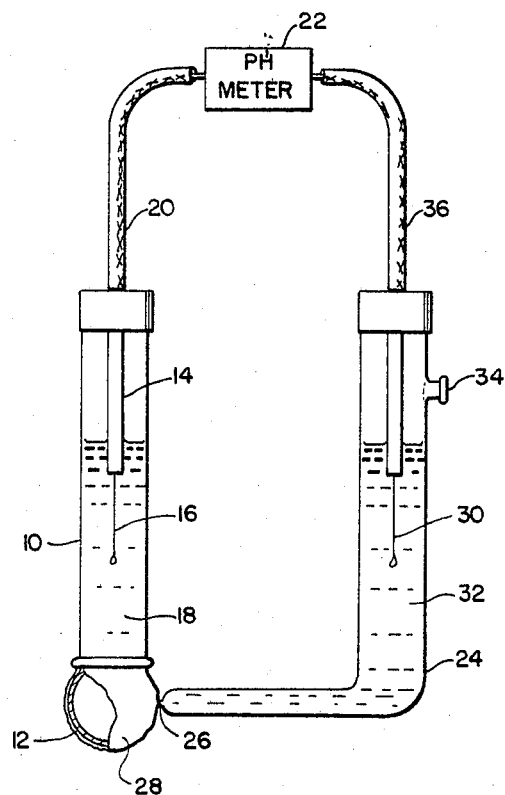
INVENTOR.
EDWIN P. ARTHUR
BY
ATTORNEY

3,479,255
ELECTROCHEMICAL TRANSDUCER
Edwin P. Arthur, Fullerton, Calif., assignor to Beckman Instruments, Inc., a corporation of California
Filed Jan. 27, 1964, Ser. No. 340,145
Int. Cl. G01n 27/26; A62c
U.S. Cl. 204—1                                   2 Claims

ABSTRACT OF THE DISCLOSURE

An electrochemical transducer for detecting in a sample a factor which inhibits biological activity such as poisonous materials. The transducer includes an ion sensitive surface coated with a material which is capable of supporting biological activity. When the sample containing a factor which inhibits biological activity contacts the coated ion sensitive surface, the electrochemical characteristics of the coating are changed. The changed characteristics are electrolytically sensed at the ion sensitive surface of the transducer.

---

The present invention relates to a method and apparatus for detecting the presence of certain substances and, more particularly, to a method and apparatus for detecting in a sample the presence of a factor which inhibits biological activity.

Occasionally the necessity arises for detecting the presence of certain substances which inhibit biological activity, such as an airborne poison, toxic products, poison residue left from insecticide sprays on plant leaves, and other similar factors. Heretofore, no simple and inexpensive means has been developed for detecting the presence of such substances.

Accordingly, it is the principal object of the present invention to provide a method and apparatus for detecting in a sample the presence of factors which inhibit biological activity.

A further object of the invention is to provide a simple and inexpensive method and apparatus for detecting any factor which inhibits biological activity.

According to the principal aspect of the present invention, an ion sensitive surface is coated with a material which is basically capable of supporting biological activity. The coated ion sensitive surface is then contacted with a sample; if the sample contains a factor which inhibits biological activity, the electrochemical characteristics of the coating are changed, which is sensed at the ion sensitive surface; and made evident by conventional amplification and display means. Hence, any factor which inhibits biological activity may be readily and inexpensively sensed by the method and apparatus of the present invention.

Other objects, aspects and advantages will become apparent from the following description taken in connection with the accompanying drawing wherein the apparatus of the present invention is illustrated with the coated ion sensitive surface being shown partially in section.

Referring now to the drawing, the apparatus of the invention is shown which is capable of detecting in a sample the presence of a factor which inhibits biological activity. The apparatus includes a transducer 10 which may be similar to a conventional glass electrode. The transducer is provided with a blown unannealed barrier or bulb 12 of ion sensitive glass. The transducer, in this instance, is a pH sensitive glass electrode and is provided with an internal half-cell 14 based on a noble metal (platinum) wire 16 as is well-known to those skilled in the art. The transducer 10 is filled with a suitable electrolyte 18, for example, a citrate pH 4 buffer, to a height above the coated wire 16. The wire is coupled to a conductor 20 by means of which the transducer may be connected to a suitable amplifying apparatus such as a conventional pH meter 22.

The apparatus also includes a reference half-cell generally indicated at 24. The reference half-cell is positioned with respect to the glass electrode 10 so that its leak structure 26 contacts a coating 28 on the glass electrode. The coating will be described later and comprises an important feature of this invention. The reference half-cell 24 is provided with an internal electrode 30 and is filled with a suitable electrolyte 32 through an opening 34 as is well-known to those familiar with the art. The internal electrode 30 is coupled with a conductor 36 which is connected to the pH meter 22, thereby completing the electronic and electrolytic path between the transducer, reference half-cell, and amplifier.

As stated before, an important feature of this invention is the provision of a special coating 28 on the ion sensitive surface 12 of the transducer 10. The coating must be formed of a material which is capable of supporting biological activity. Generally speaking, the coating includes a nutrient and a means for metabolizing the nutrient to produce a product of decomposition which provides a certain ion concentration in the coating which is to be measured by the pH meter 22. When the coating 28 is contacted by a sample which contains a factor which inhibits biological activity, the metabolizing of the nutrient in the coating is decreased and, likewise, the product of decomposition which determines the ion concentration of the coating is also decreased, which decrease is sensed by the transducer 10 and measured by the pH meter 22. Thus, there is provided by the apparatus of this invention a means for quantitatively determining the level of any of certain poisonous factors in a sample which inhibit the biological activity of the coating 28.

Given by way of example, but not by limitation, is a list of substances capable of metabolizing a nutrient, namely, yeast, fungi, mold, mildew, an alga or bacterium. Preferably, a nutrient and any one or more of the above metabolizing life forms are mixed in a gel such as animal gelatin or fish glue to provide a coating material which will adhere to the barrier 12 when the barrier is dipped into the gel mixture. Upon removal of the barrier from a mixture of these materials, a transducer is provided which is capable of detecting any poisonous material which inhibits biological activity, assuming that there is available sufficient heat around the trandsucer and sufficient water in the gel to support biological activity. Generally, with a coating of wet gel including nutrient and any one or more of the above listed metabolizing substances, a slightly elevated ambient room temperature is all that is required so that biological activity may take place.

The above described apparatus and method are suitable for laboratory determinations of poisonous materials but, preferably, an apparatus should be provided in which the coating 28 is capable of being stored and used in places other than a laboratory where the materials for forming the gel coating on the transducer are not available. To this end, once the transducer is dipped in the gel mixture of nutrient and a metabolizing agent, the coating is dried so that it is dormant. Thereafter, the transducer with the dried, dormant life coating is placed in aseptic storage until it is ready for use. Otherwise, if the coating remains as a wet gel, biological activity would tend to continuously take place until the metabolizing agent completely metabolizes all the nutrient in the coating. When it is desired to use the transducer having the dried coating thereon, the transducer is removed from the aseptic storage and subjected to sufficient heat and moisture so that the nutrient in the coating will be metabolized and, therefore, biological activity induced. Generally, even room temperature is sufficient to induce biological activity and the moisture may be most easily provided by merely dipping the coated portion 28 of the transducer in a body of water, although in some cases, sufficient moisture is available in the ambient atmosphere to support a high level of the biological activity. When the coating is so conditioned, the reference electrode 24 is brought into a position close to the transducer 10 so that the liquid junction structure 26 contacts the wet coating and provides a liquid path between the transducer 10 and reference halfcell 24.

If the sample is a liquid, to quickly reach equilibrium it is best to stir the sample. Moreover, if a protein gelatin such as animal gelatin or fish glue is used in forming the coating 28, a digestant such as papain or pepsin should be mixed with the sample to ensure quickly a true final response from the ion sensitive surface 12.

An electrochemeical apparatus as described above has been constructed in which a coating was provided on the glass barrier of a conventional glass electrode. The coating comprised a nutrient gel consisting of a mixture of animal gelatin and powdered whey which contains lactos. As the means for metabolizing the nutrient, there was provided a powdered yeast, *lactobacillus acidophilus*. The gelatin, whey and yeast were mixed to form a gel or paste and the ion sensitive barrier of the trandsucer was dipped in the gel to completely coat the barrier. Thereafter, the coating was dried and the transducer placed in aseptic storage for several days. Thereafter, the transducer was removed from storage and the dormant life coating on the barrier was dipped in a body of water to provide sufficient moisture in the coating which, together with the room temperature, permitted the coating to support biological activity. The biological activity which took place in the coating was the metabolizing of the Lactobacillus thereby producing a lactic acid which altered the ion concentration of the decomposition products of the coating. The changed ion concentration was detected by contacting the liquid junction structure of a reference electrode to the coating and connecting the reference half-cell and the glass electrode to a pH meter. During the metabolizing of the nutrient by the yeast, a certain signal level was displayed by the pH meter. Then comparable units were contacted with two different poisonous substances which inhibit biological activity, namely malathion (O,O-dimethyl dithiophosphate of diethyl mercaptosuccinate) and Merck Butoben (n-butyl parahydroxybenzoate). Each of these substances inhibited the metabolizing of the Lactobacillius and, therefore, decreased the production of lactic acid. Consequently, the ion-concentration of the coating decreased, which decrease was sensed by the pH meter and, thus, gave a signal level to indicate the presence of the poisonous substance.

Since the biological activity of the coating changes with time, it is best for detecting poisonous substances which inhibit biological activity to provide a pair of similar apparatus as shown in the drawing in which each of the transducers 10 are subjected to the same temperature and moisture and only one of the transducers is contacted by a poisoned sample. Thus, the level of poison in a sample can be continually determined by comparing the difference in the output signals of the two apparatus.

A pair of apparatus of the type shown in the drawing has been constructed and only one of the glass electrodes was contacted by a poisoned sample so the difference in the outputs of the two apparatus could be compared as described above. The coating on the ion sensitive surfaces of the glass electrodes included in this case as the nutrient, a crude cane sugar concentrate, and as the metabolizing substance a dry viable culture of a strain of saccharomyces yeast. The sample used was a stock of pasteurized apple cider. The apple cider was divided into two parts, one being free of any poisonous materials, and the other had added to it 10 parts per million of Butoben from a stock which was half saturated in a solution of purified methanol. The two apparatus were then connected to a pH meter in which each scale division on the pH meter scale indicated 0.01 pH unit.

When the two glass electrodes were separately contacted by the poison free apple cider and the apple cider containing Butoben, the meter readings were originally 110 and 110. After a ltttle over three hours time, the meter reading on the apparatus contacted b ythe plain cider was 107 whereas the reading from the apprtaus in which the sample used contained Butoben was 114 thus showing a reduction in biological activity at the second apparatus, that is, a change in voltage indicating an increase of acid. The test was accomplished at a room temperature near 35° C. Both samples were very near the same temperature at all times when tested. It is seen that the signal difference betwen the two apparatus was 0.07 pH unit which would enable one to estimate the effect of the "poison," Butoben, in a concentration as little as 10 parts per millton. If known quantities of Butoben over a predetermined range desired to be tested is known, then the difference in readings from the pH meters of the two apparatus may be correlated with respect to such known quantities whereby the level of Butoben may be readily estimated.

It is to be understood that the apparatus of the present invention may be utilized to detect substances which inhibit biological activity in either gases, liquids or solids. One example of testing for poison in a semi-solid is the testing of parathion, which is a residue from insecticide spray on cabbage. The parathion may be detected by taking a leaf of cabbage and grinding up the leaf into a slurry and then contacting the transducer 10 of the invention to the slurry along with a comparison blank as explained above.

Although several embodiments of the invention have been disclosed herein for purposes of illustration, it will be understood that various changes can be made in the several constituents making up the coating on the ion sensitive surface of the apparatus and various changes may be made in the form, details and arrangement and proportions of the variouse parts of the apparatus without departing from the spirit and scope of the invention as defined by the appended claims.

What is claimed is:

1. In a method for detecting in a sample the presence of a factor which inhibits biological activity, the steps of:
    providing a first transducer having an ion sensitve surface with a dried coating on said surface, said coating including a nutrient and a form of dormant life capable of metabolizing and nutrient to produce a product of decomposition which changes the ion concentration of the composition products of said coating;
    subjecting said coating to sufficient moisture and heat so that said moisture is absorbed in said coating and biochemical metabolism of said nutrient ensues;
    positioning a reference half cell relative to said surface so that said moisture absorbed in said coating forms an electrolytic path between said half cell and said surface;
    providing a second transducer like said first transducer having an ion sensitive surface with a dried coating thereon of the same substance as said coating on said first transducer;
    subjecting said coating on said second transducer to the same amount of moisture and heat as the coating on said first transducer;
    positioning a second reference half cell relative to said surface of said second transducer so that the moisture absorbed in the coating on said second transducer forms an electrolytic path between said second half cell and said surface of said second transducer;
    contacting the coating only of the first transducer with a sample separate from said coating and having therein a factor which inhibits the metabolizing of said nutrient;

electrolytically sensing the changed characteristics of the contacted coating caused by the contact therewith of said factor bearing sample by measuring the potential difference between said transducer and the first mentioned reference half cell;

measuring the potential difference between said second transducer and said second reference half cell caused by the metabolizing of said nutrient; and comparing the potential difference of said two pairs of transducers and reference half cells to evaluate the concentration of said factor in said sample.

2. In a method of determining the concentration of a factor in a sample which inhibits biological activity, the steps of:

providing a pair of like transducers each having a barrier including a dormant life material capable of supporting biological activity when subjected to sufficient heat and moisture, each of said transducers being capable of producing an output signal which is a function of the biological activity of its respective barrier;

subjecting the barrier of each of said transducers to a like and sufficient amount of moisture and heat so that the barriers become equally biologically active;

contacting the said barrier of only one of said transducers with said sample; and comparing the difference in magnitude of the output signals of said transducers to determine the concentration of the factor in said sample.

References Cited

UNITED STATES PATENTS

| | | | |
|---|---|---|---|
| 2,755,243 | 7/1956 | Beckman et al. | 204—195.1 |
| 3,075,887 | 1/1963 | Silliker et al. | 195—96 |
| 3,296,113 | 1/1967 | Hansen | 204—195 |
| 3,403,081 | 9/1968 | Rohrback et al. | 204—1.1 |
| 2,829,090 | 4/1958 | Eisenman et al. | 204—1951 |
| 3,228,799 | 1/1966 | Rohrback | 136—100 |

OTHER REFERENCES

Booth et al.: "Trans. of the Faraday Soc.," vol. 56, 1960, pp. 1689–1695.

HOWARD S. WILLIAMS, Primary Examiner

T. TUNG, Assistant Examiner

U.S. Cl. X.R.

195—103.5, 104; 204—195